United States Patent
Cheng

(10) Patent No.: US 6,561,129 B1
(45) Date of Patent: May 13, 2003

(54) PET DRINKING DEVICE PROVIDED WITH IN-CAGE AND OUT-CAGE SPOUTS FOR DRINKING WATER

(76) Inventor: Chen-Hui Cheng, No. 172, Lun-Mei Rd., Chang Hua City, Chang Hua Hsien (TW)

( * ) Notice: Subject to any disclaimer, the term of this patent is extended or adjusted under 35 U.S.C. 154(b) by 0 days.

(21) Appl. No.: 10/206,025

(22) Filed: Jul. 29, 2002

(51) Int. Cl.$^7$ ................................................ A01K 7/00
(52) U.S. Cl. ...................................... 119/72.5; 119/72
(58) Field of Search .......................... 119/72, 725, 75, 119/78, 477, 475; D7/312

(56) References Cited

U.S. PATENT DOCUMENTS

| | | | | |
|---|---|---|---|---|
| 4,807,567 A | * | 2/1989 | Atchley | ...................... 119/477 |
| 5,549,074 A | * | 8/1996 | Hui | ............................... 119/477 |
| 5,669,329 A | * | 9/1997 | Krause | ....................... 119/72.5 |
| 5,934,222 A | * | 8/1999 | Hwang | .......................... 119/72 |
| 6,435,134 B1 | * | 8/2002 | Ho | ................................ 119/72 |

* cited by examiner

*Primary Examiner*—Charles T. Jordan
*Assistant Examiner*—Judith A. Nelson
(74) *Attorney, Agent, or Firm*—Harrison & Egbert

(57) ABSTRACT

A pet drinking device includes a water container, a spout seat, and a retainer. The spout seat is detachably fastened to a water outlet of the water container and is provided with at least one in-cage spout and one out-cage spout. The retainer is used to hold securely the spout seat and to fasten the pet drinking device to a pet cage such that the in-cage spout is located in the pet cage and that the out-cage spout is extended out of the pet.

2 Claims, 5 Drawing Sheets

PET DRINKING DEVICE PROVIDED WITH IN-CAGE AND OUT-CAGE SPOUTS FOR DRINKING WATER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a pet drinking device, and more particularly to a pet drinking device provided with means to make the drinking device accessible to a pet which is either confined or unconfined.

BACKGROUND OF THE INVENTION

As shown in FIG. 1, a pet drinking device of the prior art comprises a water container 10, a spout 11, and two hooks 12. The spout 11 is provided in the free end with a movable ball serving to stop the flow of water. As the pet licks the ball, the ball is caused to move inwards to allow the water to flow out of the free end of the spout 11. The prior art pet drinking device is kept in the inside of the cage by the hooks 12 and is therefore useful as long as the pet is confined in the cage. However, if the pet is unconfined from time to time, an additional drinking device is kept on the outside of the cage. The shortcoming of the prior art pet drinking device is thus readily apparent.

BRIEF SUMMARY OF THE INVENTION

The primary objective of the present invention is to provide a pet drinking device which is free of the shortcoming of the prior art pet drinking device described above.

In keeping with the principle of the present invention, the foregoing objective of the present invention is attained by a pet drinking device comprising a water container, a spout seat, and a retainer. The spout seat is detachably fastened with a water outlet of the water container and is provided with an in-cage spout and an out-cage spout. The retainer is used to hold securely the device in the inside of a pet cage such that the retainer embraces securely the spout seat. The in-cage spout is located in the inside of the pet cage, whereas the out-cage spout is extended out of the pet cage. The out-cage spout is used by a pet when the pet is not confined in the cage.

The features and the advantages of the present invention will be more readily understood upon a thoughtful deliberation of the following detailed description of the present invention with reference to the accompanying drawings.

DETAILED DESCRIPTION OF THE INVENTION

Figure 1:
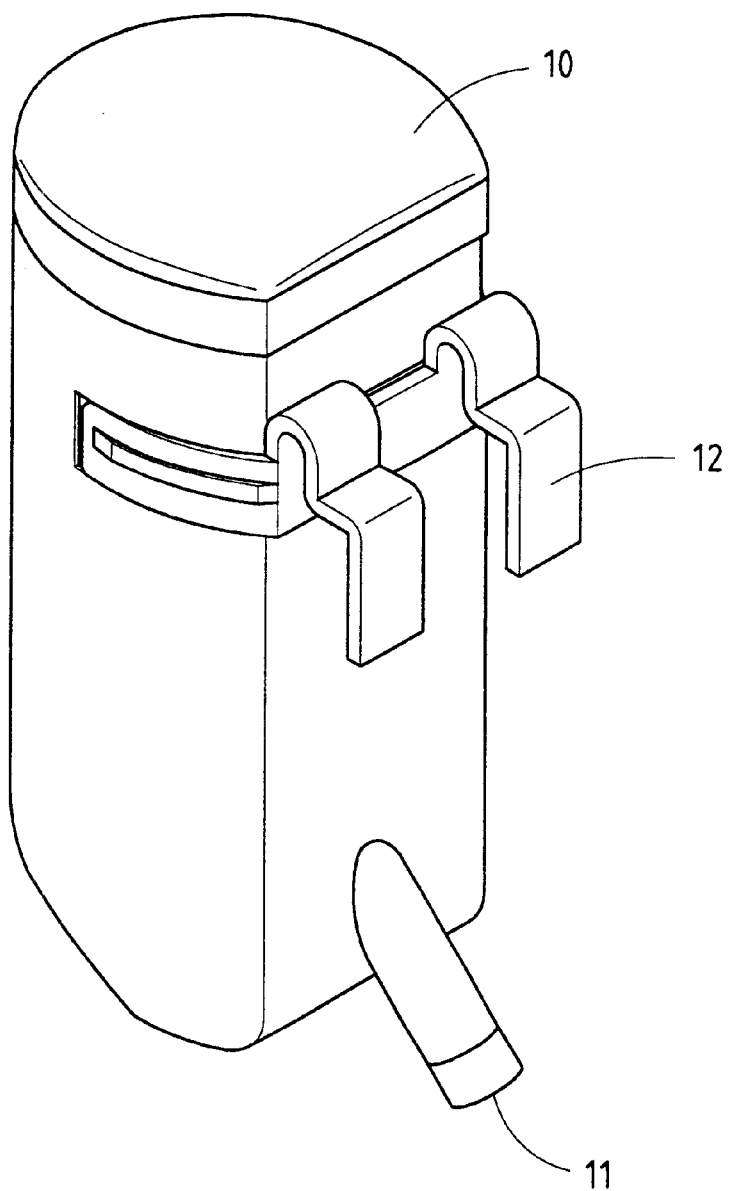
FIG. 1 shows a perspective view of a pet drinking device of the prior art.
Figure 2:
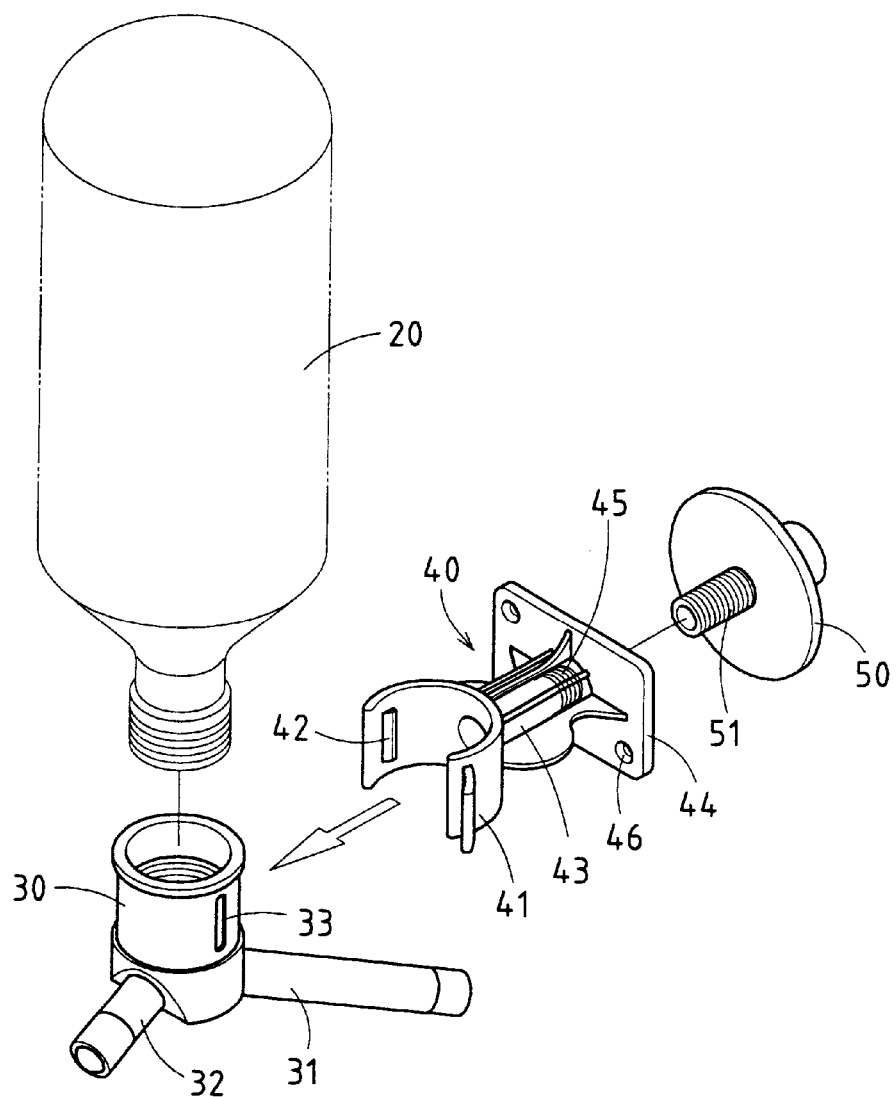
FIG. 2 shows an exploded perspective view of the present invention.
Figure 3:
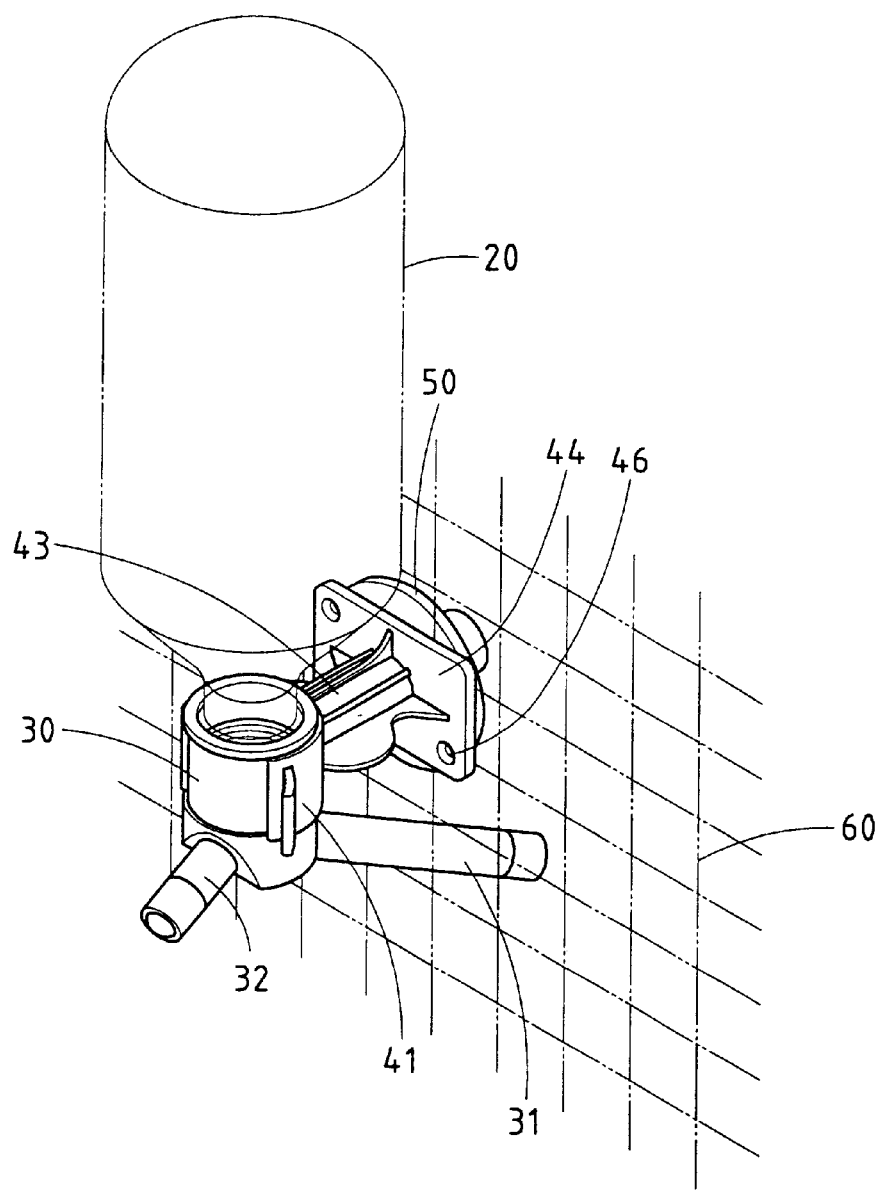
FIG. 3 shows a perspective view of the present invention.
Figure 4:
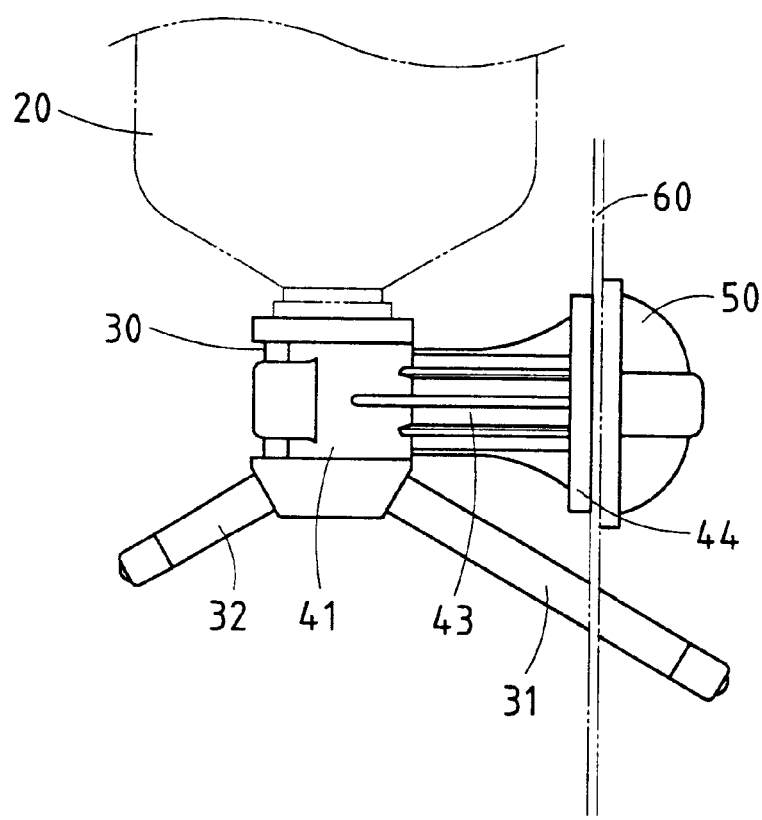
FIG. 4 shows a side schematic view of the present invention being fastened to a pet cage.

As shown in FIGS. 2, 3, and 4, a pet drinking device embodied in the present invention comprises a water container 20, a spout seat 30, and a retainer 40.

The water container 20 is shaped like a bottle and is provided with a threaded neck. The water container 20 is put upside down when in use. The spout seat 30 is detachably fastened with the threaded neck of the water container 20 and is provided with an out-cage spout 31 and an in-cage spout 32. The spout seat 30 is further provided in the outer wall with two retaining slots 33.

The retainer 40 comprises an elastic retaining body 41, a support rod 43, and a fixation plate 44. The elastic retaining body 41 is fastened with one end of the support rod 43, whereas the fixation plate 44 is fastened with another end of the support rod 43. The support rod 43 is provided with a threaded hole 45 extending along the longitudinal direction of the support rod 43. The fixation plate 44 is provided in the center with a through hole (not shown in the drawings) corresponding in shape and location to the threaded hole 45 of the support rod 43. The elastic retaining body 41 is provided with two retaining projections 42 corresponding in location to and engageable with the two retaining slots 33 of the spout seat 30. The elastic retaining body 41 is used to hold securely the spout seat 30 such that the elastic retaining body 41 embraces the spout seat 30, and that the two retaining projections 42 of the retaining body 41 are held in the two retaining slots 33 of the spout seat 30.

The pet drinking device of the present invention is kept in the inside of a pet cage 60 such that the fixation plate 44 is fastened with the wall of the pet cage 60 by a fastener 50, and that the out-cage spout 31 is extended out of the pet cage 60, and further that the in-cage spout 32 is located in the inside of the pet cage 60, as shown in FIGS. 3 and 4. The fastener 50 has a threaded shank 51, which is engaged with the threaded hole 45 of the support rod 43 of the retainer 40 via the through hole of the fixation plate 44.

Figure 5:
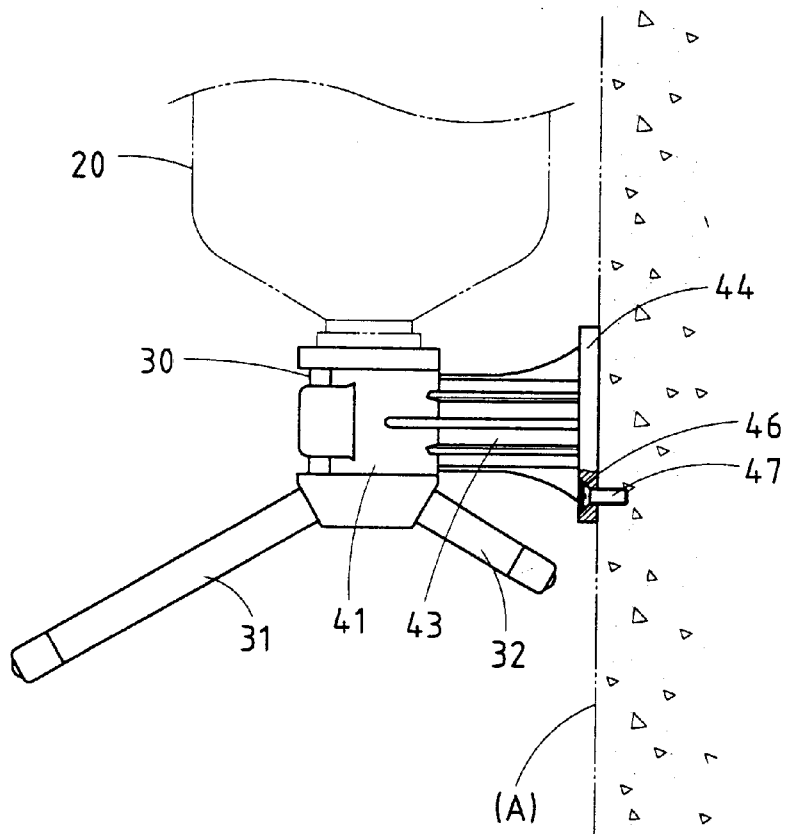
FIG. 5 shows a side schematic view of the present invention being fastened to a wall or tree trunk.

The fixation plate 44 is further provided with a plurality of fastening holes 46, which are intended to facilitate the fastening of the fixation plate 44 with a wall or tree trunk "A" by a plurality of screws 47, as shown in FIG. 5. The screws 47 are fastened onto the wall or tree trunk "A" via the fastening holes 46 of the fixation plate 44.

The embodiment of the present invention described above is to be regarded in all respects as being illustrative and nonrestrictive. Accordingly, the present invention may be embodied in other specific forms without deviating from the spirit thereof. For example, the spout seat 30 of the pet drinking device of the present invention may be provided with a plurality of out-cage spouts 31 and in-cage spouts 32, so as to enable a plurality of pets to have access to the drinking device at the same time. The present invention is therefore to be limited only by the scope of the following claims.

I claim:

1. A pet drinking fountain for a pet cage comprising;
   a water container having a water outlet;
   a spout seat detachably fastened to said water outlet of said water container, said spout seat having at least one in-cage spout and at least one out-cage spout; and a retaining means for securely holding said spout seat and for fastening said container to the pet cage such that the in-cage spout is located inside the pet cage and such that the out-cage spout extends out of the pet case, said retaining means comprising:
- a fastener;
- a support rod having a threaded hole;
- an elastic retaining body fastened to one end of said support rod; and
- a fixation plate having a through hole, said fixation plate fastened to an opposite end of said support rod such that said through hole corresponds in location with said threaded hole of said support rod, said fastener being engaged with said threaded hole of said support rod via said through hole of said fixation plate, said elastic retaining body securely embracing said spout seat.

2. The pet drinking device of claim 1, said fixation plate having a plurality of fastening holes formed therein, the retaining means further comprising:
- a plurality of fastening screws respectively received by said plurality of fastening holes of said fixation plate.

* * * * *